United States Patent [19]

Iiyama et al.

[11] Patent Number: 5,041,258

[45] Date of Patent: Aug. 20, 1991

[54] INJECTION PROCESS FOR LONG FIBER-CONTAINING RESIN

[75] Inventors: Makoto Iiyama; Yoshihiro Furugohri; Naotoshi Inamura, all of Shizuoka, Japan

[73] Assignee: Polyplastics Co., Ltd., Osaka, Japan

[21] Appl. No.: 510,105

[22] Filed: Apr. 17, 1990

[30] Foreign Application Priority Data

Apr. 28, 1989 [JP] Japan ................................ 1-111318
Apr. 28, 1989 [JP] Japan ................................ 1-111319

[51] Int. Cl.⁵ ...................... B29C 45/48; B29C 45/60
[52] U.S. Cl. ............................ 264/328.1; 264/328.18; 366/89; 425/207; 425/587
[58] Field of Search ............ 264/328.1, 328.6, 328.17, 264/328.18; 425/207, 208, 209, 582, 583, 585, 587; 366/89

[56] References Cited

U.S. PATENT DOCUMENTS

| | | | |
|---|---|---|---|
| 3,712,776 | 1/1973 | Woodham et al. | 366/89 |
| 3,746,315 | 7/1973 | Rizzi et al. | 366/319 |
| 4,155,655 | 5/1979 | Chiselko et al. | 366/89 |
| 4,299,792 | 11/1981 | Nunn | 366/90 |
| 4,399,085 | 8/1983 | Belbin et al. | 264/40.5 |
| 4,670,203 | 6/1987 | Chang | 425/208 |
| 4,708,623 | 11/1987 | Aoki et al. | 425/208 |
| 4,789,511 | 12/1988 | Bilgin | 425/207 |

*Primary Examiner*—Jill L. Heitbrink
*Attorney, Agent, or Firm*—Merchant, Gould, Smith, Edell, Welter & Schmidt

[57] ABSTRACT

A resin composition of a thermoplastic resin and long fiber is injected into a molded article having good physical properties by molding the composition in the form of a pellet having a length of 3 mm or more and containing 10 to 80% by weight, based on the composition, of a fiber having a length substantially equal to that of the pellet and arranged in the lengthwise direction of the pellet, characterized by using an injection molding machine having a nozzle diameter of 6 mm or more.

7 Claims, No Drawings

INJECTION PROCESS FOR LONG FIBER-CONTAINING RESIN

The present invention relates to a method of injection molding of a thermoplastic resin composition reinforced with a long fiber, and a molded article produced by said method. In particular, the present invention relates to an injection molding method for producing a molded article having excellent strength, rigidity, impact resistance, dimensional accuracy, surface smoothness, etc. by taking advantage of features of a thermoplastic resin composition reinforced with a long fiber, and also relates to a molded article.

Prior Art

A resin composition reinforced with long fibers prepared by pultrusion, filament winding or the like and doubled, or a molded article thereof is favorable for improving the strength, rigidity, impact resistance, etc. of the resin through utilization of the features inherent in the long fiber to the maximum. In most of the above-described long fiber-reinforced resin compositions or molded articles thereof, a thermosetting resin has hitherto been used as a base resin because the fiber can be easily impregnated therewith. In order to use a thermosetting resin as the base resin, however, it was necessary to provide a step of reacting and curing the base resin, which brought about problems of poor molding efficiency (productivity) and limited shape of the product, thus lacking in versatility. On the other hand, when the base resin is a thermoplastic resin, no sufficient impregnation of the fiber with the resin can be attained because the viscosity of the resin is high, so that the fiber and the resin easily separate from each other, which unfavorably spoils the moldability of the resin or makes it impossible to attain any sufficient reinforcing effect of the fiber, i.e., renders this resin unsuitable for practical use. However, with progress in the impregnation technique in recent years, in particular improvement in the apparatus for impregnation, it has become possible to prepare a long fiber-reinforced resin composition comprising a thermoplastic resin as the base resin and a fiber successfully impregnated with the resin, so that the thermoplastic resin has come to draw attention abruptly.

However, the long fiber-reinforced thermoplastic resin composition potentially having very excellent properties had a problem that the excellent properties were lost during molding because no injection molding technique capable of keeping the features of the composition intact has been established. Specifically, when the above-described long fiber-reinforced thermoplastic resin composition is molded by conventional injection molding technique known in the art, the fiber is broken during molding, which causes the features attained by the reinforcement with a long fiber to be lost, so that no significant difference in the properties is observed between molded article thereof and that of the short fiber-reinforced resin composition. For this reason, an improvement in the molding technique is necessary for preparing a molded article having further improved strength, rigidity, impact resistance, deformation resistance, surface appearance of molding, etc. through utilization of the features of the long fiber-reinforced thermoplastic resin composition.

The present inventors have made intensive studies on a molding method for preparing a molded article having further improved strength, rigidity, impact resistance, deformation resistance, etc. through sufficient utilization of the features inherent in the long fiber-reinforced thermoplastic resin composition, which has led to the completion of the present invention.

Accordingly, the present invention relates to a method of injection molding of a long fiber-containing thermoplastic resin composition by molding a thermoplastic resin composition in the form of a pellet having a length of 3 mm or more and containing 10 to 80% by weight, based on the composition, of a fiber having a length substantially equal to that of the pellet and arranged in the lengthwise direction of the pellet, characterized by using an injection molding machine having a nozzle diameter of 6 mm or more, and also relates to a molded article prepared by said method.

At the outset, the molding method employed in the present invention will be described.

The molding method of the present invention has been accomplished for the purpose of providing a molded article having high strength, rigidity, impact property, etc. through utilization of excellent properties inherent in the long fiber-reinforced thermoplastic resin composition and has the following features.

First of all, in the molding method of the present invention, it is necessary to use an injection molding machine wherein the nozzle diameter is 6 mm or more. It has been found that when use is made of a molding machine wherein, as with conventional general injection molding machines, the nozzle diameter is below the above range and 2 to 5 mm, the fiber is severely broken in the nozzle section during injection of a molten resin composition, which makes it impossible to prepare the intended molded article having high strength, rigidity and impact strength. There is no limitation on the upper limit of the nozzle diameter, and the upper limit may be large as far as it is within a range acceptable when the relationship with the cylinder diameter of the molding machine is taken into consideration. The preferred nozzle diameter depends also on the cylinder diameter and it is preferred that the molding is conducted by making use of a molding machine wherein the nozzle diameter to cylinder diameter ratio is 0.13.

In the present invention, it has been found that the use of a molding machine having a screw channel depth of the molding machine of 5 mm or more along substantially the whole length of the screw and 7 mm or more at least in the feed section besides the above-described requirement for the nozzle diameter is more useful. When use is made of a molding machine wherein, as with conventional general injection molding machines, the screw channel depth is 2 to 5 mm in the metering section (usually the shallowest section) and 4 to 7 mm in the feed section, the adverse effect of the breaking of the fiber in the screw section during plasticization and kneading on the property of the molding cannot be ignored. The upper limit of the screw channel depth may be large as far as it is within a range acceptable when the relationship with the screw diameter or the strength is taken into consideration. The molding is preferably conducted by making use of an injection molding machine wherein the screw channel depth is 6.5 mm or more along substantially the whole length of the screw and 8.5 mm or more at least in the feed section. It is preferred that the screw channel depth to cylinder diameter ratio is 0.1 or more along the whole length of the screw and 0.14 or more at least in the feed section.

Further, the use of a molding machine having a screw length (L) to diameter (D) ratio of 7 to 15 is also useful. Molding with a molding machine having a screw length (L) to diameter (D) ratio of less than 7 renders plasticization and kneading insufficient while when the length (L) to diameter (D) ratio of the screw is 15 to about 25 like in an ordinary injection molding machine, the fiber is broken during kneading, which somewhat spoils excellent properties of the long fiber-reinforced composition. The screw length (L) to diameter (D) ratio is still preferred.

Use of a screw having a compression ratio of less than 1.8 is also preferred.

In the present invention, when a thermoplastic resin composition reinforced with a long fiber is molded merely by using an injection molding machine improved as described above, the breaking of the fiber during molding is reduced to enable the preparation of a molded article having excellent strength, rigidity, impact property, etc. However, in order to prepare a molded article having further improved characteristics, it is preferred to adopt the following molding conditions.

One of the preferred molding conditions is to conduct metering and plasticization of the resin composition at a screw revolution of 20 to 50 rpm and a screw back pressure of 0 to 50 kg/cm$^2$. When the screw revolution is less than 20 rpm, it takes much time to meter and plasticize the resin, which is unfavorable from the viewpoint of moldability, particularly molding cycle. On the other hand, when the screw revolution is as high as 50 to 200 rpm like in an ordinary molding, the adverse effect of the breaking of the fiber on the properties of the molded article becomes unnegligible. With regard to the back pressure as well, it is impossible to avoid a lowering in the properties to some extent due to breaking of the fiber when the back pressure is 50 to 100 kg/cm$^2$ generally used in the art. The back pressure is preferably 0 to 30 kg/cm$^2$. Another preferred molding condition is to conduct the molding at an injection speed (a screw advance speed) of 0.2 to 1.0 m/min. When the injection speed is very low, the moldability such as molding cycle and packing becomes poor, while when the injection speed is 1 to 10 m/min generally used in the art, it is impossible to avoid the adverse effect of the breaking of the fiber on the properties of the molded article. The resin temperature for injection molding is preferably somewhat above the resin temperature generally used in the art for the molding of a fiber-reinforced resin composition.

There is no particular limitation on other structures of the molding machine and molding conditions which have not been referred to in the above description, and they may be properly selected from structures of molding machines and molding conditions known in the art.

The long fiber-containing thermoplastic resin composition used in the molding according to the present invention will now be described.

The long fiber-containing thermoplastic resin composition used in the present invention is a composition in the form of a pellet having a length of 3 mm or more and containing 10 to 80% by weight, based on the composition, of a fiber having a length substantially equal to that of the pellet and arranged in the lengthwise direction of the pellet, for example, one prepared by a method such as pultrusion. Use of a composition in the form of a pellet having a length of 5 mm or more is particularly preferred.

There is no particular limitation on the thermoplastic resin as the base, and any known thermoplastic resin may be used. Examples of the thermoplastic resin include olefin polymers (such as polyethylene and polypropylene), acrylate or methacrylate-polymers (such as polymethyl methacrylate), polystyrene, AS resin, ABS resin, polyacetal, polyamides (such an nylon 6 and nylon 66), polyesters (such as polyethylene terephthalate and polybutylene terephthalate), polycarbonates, polyphenylene sulfides, and polyurethanes. The above-described resins may be those modified by any known method such as crosslinking. Further, it is also possible to use the above-described resins in a combination of two or more of them.

The fiber may be any of known fibers such as glass fibers, carbon fibers, silica fibers, silica- alumina fibers, boron fibers, boron nitride fibers, potassium titanate fibers, metallic fibers, and heat-resistant polymeric fibers. It is also possible to use them in a combination of two or more of them. Glass fibers, carbon fibers, and heat-resistant polymeric fibers are particularly preferred. The content of the fiber is 10 to 80% by weight based on the composition. When the fiber content is less than 10% by weight, no sufficient improvement can be attained in the strength, rigidity, impact strength, etc., while when the content exceeds 80% by weight, it becomes very difficult to conduct molding. In particular, when the molding method of the present invention is applied to a resin composition containing a long fiber in a concentration of 30 to 70% by weight based on the composition, a significant effect can be attained. Specifically, the breaking of the fiber, i.e., a drawback of the conventional molding method, can be prevented, which realizes a remarkable improvement in the strength, rigidity, impact strength, etc. of the molding and further favorably brings about an advantage of freedom from molding failure.

The long fiber-reinforced resin composition of the present invention may contain known substances generally added to a thermoplastic resin, e.g., stabilizers such as antioxidants and ultraviolet absorbers, antistatic agents, flame retardants, colorants such as dyes and pigments, lubricants, crystallization promoters, nucleating agents, and particulate or flaky inorganic fillers such as carbon black, glass beads, powdery glass, glass flakes, silica, and mica.

The injection molding method according to the present invention greatly prevent the breaking of a fiber during molding, which enables preparation of a molded article having excellent strength, rigidity, impact resistance, dimensional accuracy, surface smoothness, etc. through sufficient utilization of the properties inherent in a long fiber-containing thermoplastic resin composition and therefore renders the present invention very useful. This can serve to significantly widen the range of application of a long fiber-containing thermoplastic resin composition.

EXAMPLES

The present invention will now be described in more detail by way of the following Examples, though the present invention is not limited to these only.

EXAMPLES 1 TO 11 AND COMPARATIVE EXAMPLES 1 TO 7

Long-fiber-reinforced thermoplastic resin compositions listed in Tables 1 to 3 (all the compositions having been prepared by pultrusion in a pellet form of 12 mm in length, and the fiber length being substantially equal to the length of the pellet) were subjected to injection molding by a molding method satisfying the requirements of the present invention as specified in the Tables. The results of evaluation on the properties etc. are shown in Tables 1 to 3.

For comparison, the results of evaluation on the molded article prepared by molding the same resin composition as that used in the Examples by the conventional molding method known in the art and the results of evaluation on the molded article prepared by molding a short fiber-reinforced thermoplastic resin composition known in the art by the molding method satisfying the requirements specified in the present invention are also shown in Tables 1 to 3.

The properties were evaluated by the following measuring methods.

tensile strength and elongation: according to ASTM D-638
modulus in bending: according to ASTM D-790
impact strength: according to ASTM D-256
dispersed fiber length: a molded piece for tensile test was provided, the resin was decomposed and removed, and the remaining fiber was observed by a universal projector to measure the fiber length.
warpage of molded article: a flat plate of 120 mm square and having a thickness of 2 mm was molded, and the degree of warpage of the molded article was observed with the naked eye to conduct relative evaluation.
surface appearance (roughness): the above-described molded piece (flat plate) was observed with the naked eye to conduct relative evaluation of the surface smoothness (roughness).

As is apparent from the results, the molding method of the present invention exhibits a special effect when used in the moulding of a thermoplastic resin composition reinforced with a long fiber.

EXAMPLES 12 TO 19 AND COMPARATIVE EXAMPLE 8

Example 1 was followed, except for material and processing conditions listed in Table 4. Results are shown in Table 4.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Composition |  |  |  |  |  |  |  |  |
| polypropylene (wt %) | 40 | 40 | 40 | 40 | 40 | 40 | 40 | 40 |
| glass fiber (wt %) | 60 | 60 | 60 | 60 | 60 | 60 | 60 | 60 |
| pellet length (mm) | 12 | 12 | 12 | 12 | 12 | 12 | 12 | 12 |
| Molding machine |  |  |  |  |  |  |  |  |
| nozzle diameter (mm) | 8 | 8 | 8 | 8 | 8 | 3 | 3 | 3 |
| screw channel depth: feed section/metering section (mm) | 6.2/2.8 | 10.5/7.7 | 10.5/7.7 | 10.5/7.7 | 10.5/7.7 | 6.2/2.8 | 6.2/2.8 | 6.2/2.8 |
| screw length (L)/diameter (D) | 21 | 21 | 11 | 11 | 11 | 21 | 21 | 21 |
| compression ratio | 2.1 | 1.3 | 1.3 | 1.3 | 1.3 | 2.1 | 2.1 | 2.1 |
| Molding conditions |  |  |  |  |  |  |  |  |
| screw revolution (rpm) | 30 | 30 | 30 | 100 | 30 | 30 | 100 | 30 |
| back pressure (kg/cm$^2$) | 0 | 0 | 0 | 75 | 0 | 0 | 75 | 0 |
| injection speed (m/min) | 0.5 | 0.5 | 0.5 | 0.5 | 5 | 0.5 | 0.5 | 5 |
| Results of evaluation |  |  |  |  |  |  |  |  |
| tensile strength (kg/cm$^2$) | 672 | 718 | 740 | 695 | 701 | 570 | 565 | 574 |
| tensile elongation (%) | 0.6 | 0.7 | 0.7 | 0.7 | 0.7 | 0.5 | 0.5 | 0.5 |
| modulus in bending (kg/cm$^2$) | $13 \times 10^4$ | $13 \times 10^4$ | $13 \times 10^4$ | $13 \times 10^4$ | $13 \times 10^4$ | $13 \times 10^4$ | $13 \times 10^4$ | $13 \times 10^4$ |
| impact strength (kg · cm/cm) | 19 | 23 | 25 | 22 | 23 | 11 | 10 | 11 |
| dispersed fiber length (mm) | 4.3 | >5 | >5 | 4.7 | 4.7 | 2.6 | 2.3 | 2.4 |
| warpage | small | very small | very small | small~(medium) | small~(medium) | large | large | large |
| surface smoothness | good | good | good | good | good | poor | poor | poor |

TABLE 2

|  | Ex. 6 | Ex. 7 | Ex. 8 | Comp. Ex. 4 | Comp. Ex. 5 | Comp. Ex. 6 |
|---|---|---|---|---|---|---|
| Composition |  |  |  |  |  |  |
| polybutylene terephthalate (wt %) | 60 | 60 | 60 | 60 | 60 | 60 |
| glass fiber (wt %) | 40 | 40 | 40 | 40 | 40* | 40* |
| pellet length (mm) | 12 | 12 | 12 | 12 | 3 | 3 |
| Molding machine |  |  |  |  |  |  |
| nozzle diameter (mm) | 8 | 8 | 8 | 3 | 8 | 3 |
| screw channel depth: feed section/metering section (mm) | 6.2/2.8 | 10.5/7.7 | 10.5/7.7 | 6.2/2.8 | 10.5/7.7 | 6.2/2.8 |
| screw length (L)/diamter (D) | 21 | 21 | 11 | 21 | 11 | 21 |
| compression ratio | 2.1 | 1.3 | 1.3 | 2.1 | 1.3 | 2.1 |
| Molding conditions |  |  |  |  |  |  |
| screw revolution (rpm) | 30 | 30 | 30 | 30 | 30 | 30 |
| back pressure (kg/cm$^2$) | 0 | 0 | 0 | 0 | 0 | 0 |
| injection speed (m/min) | 0.5 | 0.5 | 0.5 | 0.5 | 0.5 | 0.5 |
| Results of evaluation |  |  |  |  |  |  |
| tensile strength (kg/cm$^2$) | 1379 | 1404 | 1427 | 1300 | 1330 | 1325 |
| tensile elongation (%) | 1.7 | 1.8 | 1.8 | 1.3 | 1.5 | 1.5 |
| modulus in bending (kg/cm$^2$) | $13 \times 10^4$ | $13 \times 10^4$ | $13 \times 10^4$ | $13 \times 10^4$ | $12 \times 10^4$ | $12 \times 10^4$ |
| impact strength (kg · cm/cm) | 28 | 31 | 32 | 23 | 13 | 12 |
| dispersed fiber length (mm) | 4.2 | >5 | >5 | 2.5 | <1 | <1 |

TABLE 2-continued

|  | Ex. 6 | Ex. 7 | Ex. 8 | Comp. Ex. 4 | Comp. Ex. 5 | Comp. Ex. 6 |
|---|---|---|---|---|---|---|
| warpage | small | small | very small | large | large | large |
| surface smoothness | good | good | good | poor | poor | poor |

Note:
*short fiber (average fiber length in pallet: 0.32 mm)

TABLE 3

|  | Ex. 9 | Ex. 10 | Ex. 11 | Comp. Ex. 7 |
|---|---|---|---|---|
| Composition |  |  |  |  |
| polyethylene terephthalate (wt %) | 60 | 60 | 60 | 60 |
| glass fiber (wt %) | 40 | 40 | 40 | 40 |
| pellet length (mm) | 12 | 12 | 12 | 12 |
| Molding machine |  |  |  |  |
| nozzle diameter (mm) | 8 | 8 | 8 | 3 |
| screw channel depth: feed section/metering section (mm) | 6.2/2.8 | 10.5/7.7 | 10.5/7.7 | 6.2/2.8 |
| screw length (L)/diameter (D) | 21 | 21 | 11 | 21 |
| compression ratio | 2.1 | 1.3 | 1.3 | 2.1 |
| Molding conditions |  |  |  |  |
| screw revolution (rpm) | 30 | 30 | 30 | 30 |
| back pressure (kg/cm$^2$) | 10 | 10 | 10 | 10 |
| injection speed (m/min) | 0.5 | 0.5 | 0.5 | 0.5 |
| Results of evaluation |  |  |  |  |
| tensile strength (kg/cm$^2$) | 1921 | 2047 | 2100 | 1600 |
| tensile elongation (%) | 1.3 | 1.4 | 1.4 | 1.2 |
| modulus in bending (kg/cm$^2$) | 14.7 × 10$^4$ | 14.5 × 10$^4$ | 14.7 × 10$^4$ | 14.5 × 10$^4$ |
| impact strength (kg · cm/cm) | 19 | 21 | 22 | 15 |
| dispersed fiber length (mm) | 4.6 | >5 | >5 | 2.7 |
| warpage | small | very small | very small | large |
| surface smoothness | good | good | good | poor |

TABLE 4

|  | Ex. 12 | Ex. 13 | Ex. 14 | Ex. 15 | Ex. 16 | Ex. 17 | Comp. Ex. 8 | Ex. 18 | Ex. 19 |
|---|---|---|---|---|---|---|---|---|---|
| Composition |  |  |  |  |  |  |  |  |  |
| polypropylene (wt %) | 40 | 40 | 40 | 40 | 60 | 60 | 60 | 60 | 60 |
| glass fiber (wt %) | 60 | 60 | 60 | 60 | 40 | 40 | 40* | 40 | 40 |
| pellet length (mm) | 12 | 12 | 12 | 12 | 12 | 12 | 3 | 12 | 12 |
| Molding machine |  |  |  |  |  |  |  |  |  |
| screw channel depth: feed section/metering section (mm) | 10.5/7.7 | 10.5/7.7 | 10.5/7.7 | 10.5/7.7 | 10.5/7.7 | 10.5/7.7 | 10.5/7.7 | 10.5/7.7 | 10.5/7.7 |
| screw length (L)/diameter (D) | 21 | 11 | 11 | 11 | 21 | 11 | 11 | 21 | 11 |
| compression ratio | 1.3 | 1.3 | 1.3 | 1.3 | 1.3 | 1.3 | 1.3 | 1.3 | 1.3 |
| Molding conditions |  |  |  |  |  |  |  |  |  |
| screw revolution (rpm) | 30 | 30 | 100 | 30 | 30 | 30 | 30 | 30 | 30 |
| back pressure (kg/cm$^2$) | 0 | 0 | 75 | 0 | 0 | 0 | 0 | 10 | 10 |
| injection speed (m/min) | 0.5 | 0.5 | 0.5 | 5 | 0.5 | 0.5 | 0.5 | 0.5 | 0.5 |
| Results of evaluation |  |  |  |  |  |  |  |  |  |
| tensile strength (kg/cm$^2$) | 658 | 697 | 654 | 662 | 1357 | 1392 | 1335 | 1850 | 1970 |
| tensile elongation (%) | 0.6 | 0.6 | 0.6 | 0.6 | 1.6 | 1.7 | 1.5 | 1.2 | 1.4 |
| modulus in bending (kg/cm$^2$) | 13 × 10$^4$ | 13 × 10$^4$ | 13 × 10$^4$ | 13 × 10$^4$ | 13 × 10$^4$ | 13 × 10$^4$ | 12 × 10$^4$ | 14.5 × 10$^4$ | 14.6 × 10$^4$ |
| impact strength (kg · cm/cm) | 18 | 21 | 18 | 18 | 27 | 30 | 13 | 18 | 19 |
| dispersed fiber length (mm) | 4.1 | >5 | 4.2 | 4.4 | 4.0 | 4.4 | <1 | 4.5 | >5 |
| warpage | small~ (medium) | small | small~ (medium) | small~ (medium) | small~ (medium) | small | very large | small~ (medium) | small |
| surface smoothness | good | good | good | good | good | good | poor | good | good |

We claim:

1. A method of injection molding of a long fiber-containing thermoplastic resin composition into a molded article comprising the steps of:

(a) feeding a thermoplastic resin composition into an injection molding machine, said resin composition in the form of a pellet having a length of 3 mm or more and containing 10 to 80% by weight, based on the composition, of a fiber having a length substantially equal to that of the pellet and arranged in the lengthwise direction of the pellet, said injection molding machine comprising a cylinder, a screw having a length to diameter ratio of about 7 to 15 disposed within said cylinder, and a nozzle at one end of said cylinder, said nozzle having a diameter of 6 mm or more, wherein said screw and said cylinder define a feed section at one end of said cylinder and define a screw channel depth of 5 mm or more along substantially the whole length of the screw and 7 mm or more at least in the feed section; and (b) rotating the screw to displace the resin composition through the nozzle and into a mold for producing the molded article.

2. A method of injection molding of a long fiber-containing thermoplastic resin composition according to claim 1, wherein said injection molding machine has a screw compression ratio of less than 1.8.

3. A method of injection molding of a long fiber-containing thermoplastic resin composition according to claim 2, wherein the injection molding is conducted under conditions of a screw revolution of 20 to 50 rpm and a screw back pressure of 0 to 50 kg/cm².

4. A method of injection molding of a long fiber-containing thermoplastic resin composition according to claim 2, wherein the injection molding is conducted at an injection speed or a screw advance speed of 0.2 to 1.0 m/min.

5. A method of injection molding of a long fiber-containing thermoplastic resin composition according to claim 1, wherein the injection molding is conducted under conditions of a screw revolution of 20 to 50 rpm and a screw back pressure of 0 to 50 kg/cm².

6. A method of injection molding of a long fiber-containing thermoplastic resin composition according to claim 5, wherein the injection molding is conducted at an injection speed or a screw advance speed of 0.2 to 1.0 m/min.

7. A method of injection molding of a long fiber-containing thermoplastic resin composition according to claim 1, wherein the injection molding is conducted at an injection speed or a screw advance speed of 0.2 to 1.0 m/min.

* * * * *